Patented Jan. 9, 1923.

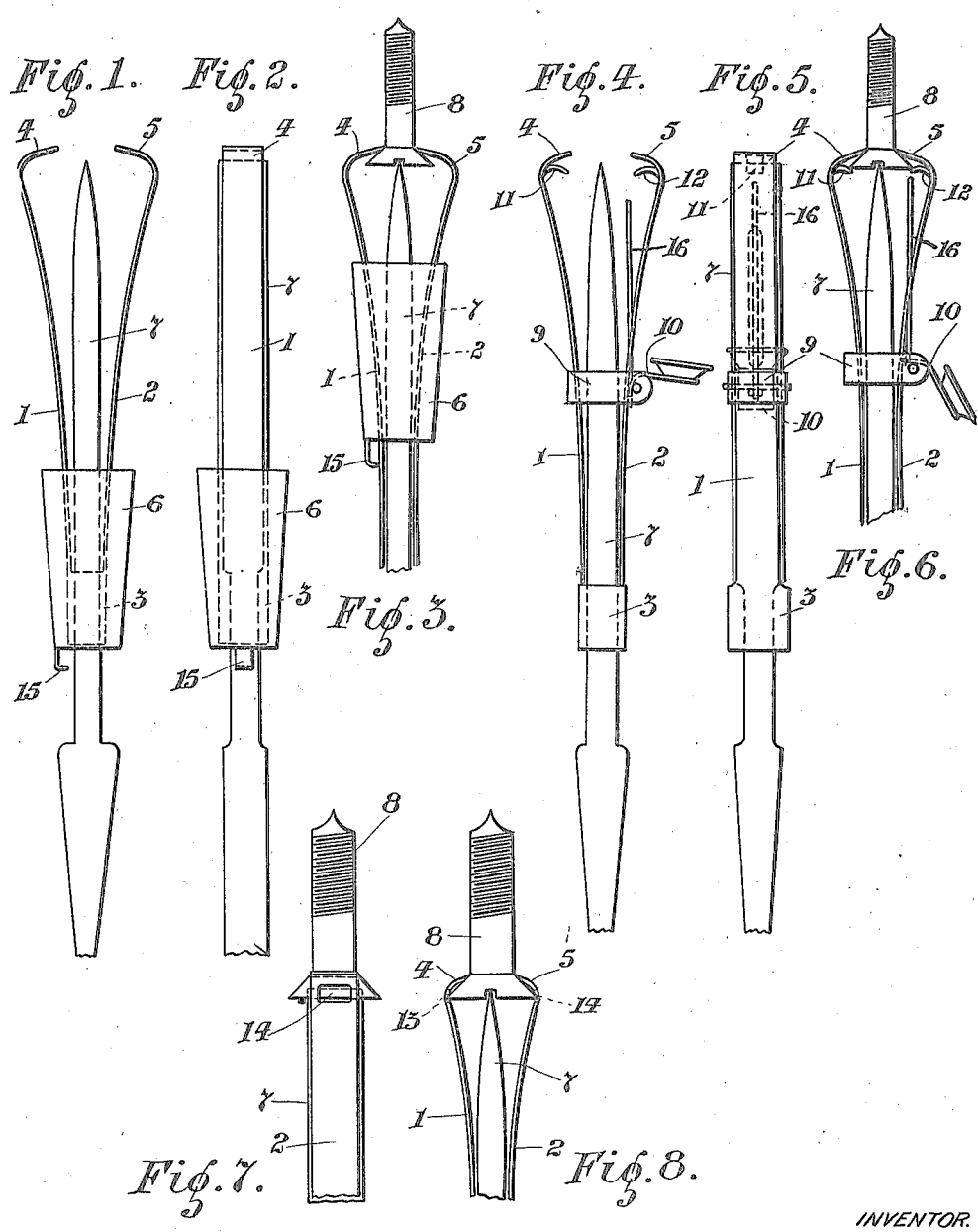

1,441,972

UNITED STATES PATENT OFFICE.

JAMES JOSEPH DOHERTY, OF LONDONDERRY, IRELAND.

SCREW DRIVER, BRACE, AND THE LIKE.

Application filed November 9, 1921. Serial No. 514,113.

*To all whom it may concern:*

Be it known that I, JAMES JOSEPH DOHERTY, of "Avoca", the Strand, residing at Londonderry, Ireland, have invented certain new and useful Improvements Relating to Screw Drivers, Braces, and the like, of which the following is a specification.

This invention relates to screw drivers, braces, and the like devices, for driving screws, boring tools, and the like.

Under this invention a screw driver, brace, or the like device, is provided with means whereby the member to be operated on by the tool is held in proper position in relation to the tool, while the latter is being operated, and means may also be provided for releasing the device from engagement with the tool when required.

The invention may be carried out in various ways, and the accompanying drawings illustrate some examples of carrying the invention into effect in connection with a screw driver.

Figs. 1 and 2 are elevations at right angles to each other of a screw driver provided with a screw holding device in accordance with the invention.

At Figs. 1 and 2 the screw holding device is shown in open position.
Fig. 3 is a similar view to Fig. 1, showing the device in the closed position with a screw held by the spring jaws and engaged by the screw driver.

Figs. 4 and 5 are elevations at right angles to each other of a modification of the device in which the jaws are so made as to securely hold the head of the screw, as shown in Fig. 6, which is a similar view to Fig. 3. In this case a sliding sleeve shown in Figs. 1 to 3 is replaced by a spring clip whereby the jaws of the device can be caused to hold a screw as shown at Fig. 6, or be released for opening to the position shown at Figs. 4 and 5 as and when required.
Figs. 7 and 8 show the top of the form of device as shown at Figs. 1 to 3 and provided with slots at the sides of the jaws into which the head of the screw can enter. These slotted jaws have the effect of more securely holding the screw in position than the jaws shown in Figs. 1, 2 and 3, and also prevent it tilting.

Referring to the drawings:—

In the example shown at Figs. 1 to 3 the device comprises two spring metal bands 1 and 2 connected at their inner ends to a sleeve 3 and at their other ends made with jaws 4 and 5. A sleeve 6 embraces the bands and is slidable relatively thereto. The sleeve 3 fits over the end of a screw driver 7 as shown at Figs. 1 and 2. By sliding the sleeve 6 towards the front of the screw driver the jaws 2 and 3 are forced towards each other, and will grip a screw or other like member placed between them, as for example, the screw 8 shown in Fig. 3. The sleeve 6 can be held forward as long as the screw driver is being operated for the driving or withdrawing of a screw, and the grip of the jaws 2 and 3 on the screw 8 can be instantly released by pulling back the sleeve 6. A projection 15 on the sleeve 6 causes the jaws 4 and 5 to come into position to receive the screw.

At Figs. 4, 5 and 6, the sleeve 6 is replaced by a spring clip 9, which, by depressing the lever 10 is forced against the bands 1 and 2 and thereby causes the jaws of the device to close on screw or like member placed between them. In the example shown at Figs. 4, 5 and 6, the jaws are made with tongues 11 and 12 and on these tongues the head of the screw can rest, the head of the screw being held between the jaws 3 and 4 and the tongues 11 and 12 as shown at Fig. 6.

The jaws shown at Figs. 1 to 3 may, as shown at Figs. 7 and 8, be made with slots 13 and 14 adapted to receive the sides of the head of the screw as shown. The tongues 11 and 12 shown at Figs. 4 to 6, and the slots 13 and 14 shown at Figs. 7 and 8, assist in preventing any tilting of the screw when it is pressed against the article into which it is to be inserted.

The sliding sleeve 6 may be arranged to engage a projection, or projections, on the bands 1 and 2 so that as the sleeve 6 moves back in releasing the jaws from engagement with the screw, it will also move the jaws clear of the point of the screw driver so that the screw can be forced fully into any article into which it is being driven.

While the device has been described in relation to a screw driver and screw, it is of course equally applicable to a bit, or equivalent.

At Figs. 4, 5 and 6 a pin 16 is shown projecting from the lever 10. When this pin 16 is pressed back by contact with the surface into which the screw is being inserted it will cause the lever 10 to be operated to release the jaws 4 and 5 from the screw.

The device is simple, and its use greatly facilitates the work of inserting or withdrawing screws, or using a boring tool, or equivalent, either with an ordinary screw driver, or with a brace.

Having now fully described my invention, what I claim to secure by Letters Patent is:—

1. The combination with a screw driver of a screw holding implement, including spring arms slidably mounted as a unit on the screw driver, the terminals of said arms being inturned and divided longitudinally, the respective divisions being spaced apart to provide relatively off set upper and lower engaging members for the head of the screw, and means for operating said arms, whereby said inturned ends may be forced toward each other or permitted to spread apart thru their inherent resiliency.

2. The combination with a screw driver of a screw holding implement, including spring arms slidably mounted as a unit on the screw driver, the terminals of said arms being inturned and divided longitudinally, the respective divisions being spaced apart to provide relatively off set upper and lower engaging members for the head of the screw, a clip engaging said spring arms, a finger lever for operating the clip to force said arms toward each other, and a projection from said lever to be engaged by the work to operate the finger lever to release the arms.

In testimony whereof I affix my signature in presence of two witnesses.

JAMES JOSEPH DOHERTY.

Witnesses:
 CHARLES N. CORMICK,
 ALEXANDER TUFF.